Patented Oct. 10, 1944

2,360,033

UNITED STATES PATENT OFFICE 2,360,033

MILK PRODUCTS AND PROCESS OF MAKING THE SAME

Lewis A. Baumann, Chevy Chase, Md., assignor, by mesne assignments, to Anthony R. Sanna, Filip Leon Sanna, and Bartell J. Sanna, a copartnership, doing business as Sanna Dairy Engineers, Madison, Wis.

No Drawing. Application March 3, 1941, Serial No. 381,591

15 Claims. (Cl. 99—54)

This invention is directed to an improvement in milk products and the process of making the same, and more particularly to a process wherein the main constituents in milk are changed with a view to rendering the final product or products of great utility and advantage in various industries.

While the present invention will be more particularly described herein as a process for the production of a product designed more particularly for use in the production of foods, it is to be specifically understood that the product has great utility and advantage in other industries, some of which will be specifically referred to hereinafter.

In the preparation of particular food products wherein milk or milk products are used, certain properties of the milk are highly desirable, such for example, as flavor, consistency, viscosity, water absorbing powers, ability to whip to a stable foam of good volume, etc. Ordinarily, it is necessary to add to the food products, wherein conventional milk or milk products are used, certain ingredients to produce the desirable characteristics in the food product which cannot be provided through the use of ordinary milk or milk products. This, for the reason that the conventional milk or milk products lack these desirable properties or do not possess them in sufficient strength. For example, the use of gelatin in ice cream to create water absorbing powers is necessary as the conventional milk or milk product cannot supply the necessary water absorbing power. Again, this water absorbing power must be created in the food product utilizing the conventional milk in the baking industry and this is true in the manufacture of numerous food products using milk. In such food products it has been found necessary to add ingredients or utilize added or complicated steps in the production of the food product in order to make up the necessary and desirable characteristics which are ordinarily lacking in conventional milk or milk powder.

The primary object of the present process as specifically defined is to subject the milk to treatment which will provide in the milk a desirable change or changes which will create or augment the desirable characteristics of the milk; that is, the essential changes necessary to provide these important and highly desirable characteristics in the food product.

As an example, the basic milk product subjected to the improved process will be indicated as cow's milk wherein the fat has been removed, generally referred to as skim milk, and while the process will be described in connection with this product, it is to be understood that it will be applicable with any kind of lacteal fluid containing all the proteins of normal milk.

In carrying out the process, it has been divided, for the purpose of description and clearness, into two distinctive treatments, the first of which will be referred to as the heat treatment and the second of which will be referred to as the chemical treatment.

The heat treatment, which constitutes an important and fundamental step, will produce in the skim milk certain vital changes as will create in itself a product which is of extreme value and importance for use in certain food products and to this extent the heat treatment constitutes in iself a process which develops suitable characteristics in the skim milk, rendering such skim milk, after such heat treatment, a particular product of material value in its use with certain food products to supply to such food products highly important and desirable characteristics which are not supplied by conventional skim milk.

The chemical treatment, which forms an essential step in the production and development of the final milk product, is desirable and necessary in order to enlarge, improve, and change to some extent the characteristics of the milk product developed under the heat treatment with a view to increasing and enlarging the field of utility of the improved milk product for use in certain food industries.

For example, the milk product produced as a result of the heat treatment alone is particularly adapted and designed for use in the baking industry and also for some uses in the confectionery industry. In the use of the heat treatment plus the chemical treatment, the milk product is of particular advantage in the use of such food products as whipping cream, ice cream and the like, the chemical treatment being also resorted to in the production of most frozen confections.

The heat treatment of the improved process is substantially as follows: The skim milk, either in its natural state or in a concentrated state, is subjected to a high temperature under pressure in a closed system. The temperature may vary between a maximum of 260 degrees Fahrenheit to a minimum of 220 degrees Fahrenheit and the milk is subjected to this particular conditioning step for periods varying from several minutes up to one hour. This step is immediately followed by releasing the pressure to atmospheric pressure in an open system with the temperature or heat degree just below boiling for a time period approximating two hours. The time period of the heat treatment will, for more specific definition, be stated to be approximately 1¼ hours in the development of the product for use in connection with food uses, but it is to be distinctly understood that in the production of the product for other purposes, and as determined by the conditions immediately above expressed, this time period may be somewhat less, or somewhat greater than that specifically expressed.

The heat treatment, with particular regard to the pressure in a closed system followed by the absence of pressure in an open system, tends to produce certain important changes in the milk product, the more prominent and important changes being well known and understood while other changes, which may be a minor character, are not so clearly understood though tests prove their undoubted existence. The primary changes resulting from the heat treatment consist in an actual change in the constituents of the milk by basically converting the mixture of proteins into a mixture of proteins with molecular weights differing from that of the proteins in the original protein mixture. In other words, the casein and albumen, the main proteins of milk, are really mixtures of proteins each having a more or less uniform and definite molecular weight as they exist normally in milk.

Following the heat treatment, the proteins are still present, with possibly slight decomposition, but the casein and albumen are made up of a different set of proteins which have molecular weights entirely different from their original condition. Furthermore, it is apparent as a result of tests, that the milk sugar, one of the main constituents of milk, is also affected, but this change in the milk sugar does not necessarily play an important part in the reactions of the final product. Furthermore, in this heat treatment, the mineral constituents of the milk are also altered, particularly in that the calcium has been thrown out of the sphere of reaction, with the result that the combination of the inorganic constituents is altered to give a different buffering action to the milk. This is proven by the fact that the test shows after the heat treatment the milk possesses a new hydrogen ion concentration radically different from that of normal milk.

The important change as a result of the heat treatment is the change of the molecular composition of the proteins. So far as it has been possible to prove by tests, it has been found that the heat treatment causes a rearrangement of the elements in the molecular structure of such proteins so that the molecular weights actually increase. This increase in the molecular weights of the proteins is in effect the production of new proteins which appear to have been previously unknown and which possess materially different properties over the conventional proteins. These properties are particularly a basis for better flavor, increased water absorption, and other properties.

Furthermore, the heat treatment undoubtedly breaks down some of these normal proteins to more simple compositions which will possess lower molecular weights. This is believed to be without appreciable influence on the desirable properties of the final product but may and probably does have an effect. The milk sugar is broken down to a combination of different sugars and while this is probably of no particular material influence on the final product, it probably does add the characteristic of increasing desirable flavor.

The heat treatment, therefore, causes a rearrangement of the elements in the molecular structure of the proteins accompanied by a partial decomposition to form more simple compounds; causes a breaking down of the milk sugar to partially form other more simple sugars; and also causes an alteration of the mineral constituents to give a new and different buffer value to the whole.

The chemical treatment, the essential second step of the process, is desirable and important in adapting the product formed as a result of the heat treatment for a materially enlarged use of the product in the manufacture of food products other than those in which the heat treatment product is particularly advantageous. This chemical treatment is designed to increase the ionization of the proteins and to augment their colloidal properties. The chemical treatment involves the addition of alkalies or alkaline salts usually possessing sodium ions to a definite hydrogen ion concentration.

To accomplish the above purpose a wide variety of alkalies or alkaline salts can be used. In the development of the product for use in connection with foods the choice is naturally limited to those which are not deleterious or inimical to health.

In connection with food products, the preferable alkali to be used in sodium hydroxide, though obviously and as contemplated, sodium carbonate, sodium bi-carbonate, tri-sodium phosphate, tetra-sodium pyrophosphate, potassium hydroxide and potassium carbonate, or any sodium, potassium or ammonium alkali or alkaline salts, singly or in desired combination may be used. It is to be particularly understood that the use of the term "alkali" in any of the appended claims is intended to define and include any one or more of the above specified alkalies or alkaline salts.

The hydrogen ion concentration is carried to points between pH 9 and 11.5. In this connection it is to be understood that the hydrogen ion concentration in the development of the product for use in foods has an approximate limit of 10.8, though in the development of the product for uses other than in connection with foods, the hydrogen ion concentration may have a limit of 11.5. For use in foods it is usually stopped at that point where the solution becomes substantially opaque and a certain degree of fluorescence is developed. This point varies, depending on the origin of the original milk, its age, and previous treatment as well as the equipment in use, but is generally around pH 10.5, but may be slightly higher or lower.

The second part of the chemical treatment involves the changing of the hydrogen ion concentration to a point where it is most desirable for the food product wherein it will be used. This is accomplished by the addition of various acids, such as hydrochloric, lactic, acetic, citric, phosphoric or tartaric, singly or in desired combination, and may be added to the product as it is, or after partial evaporation, or in the dry state. The final adjustment may vary all the way from pH 6.5 up to whatever pH would prevail immediately after the previous addition of alkalies. It is generally at some point between pH 6.5 and 8.5 which is a desirable range for the product in its use in foods.

It is to be noted that the chemical treatment may make use of hydrogen ion concentration measurements to guide the processes, since very small amounts of alkalies and acids are used in proportion to the whole. This may be of importance where use in foods is contemplated. Furthermore, for this purpose the choice of alkalies and acids is preferably limited to those that naturally exist in normal milk, and they are used in such amounts as not to change the final product to any material extent from a strictly elementary standpoint.

Thus, when the final product is used in various foods, it can replace normal milk with equal quantities, making it highly desirable from the standpoint of the many uses and augmented properties which it imparts to the food products.

The heat treatment, therefore, becomes a particularly important step in the new process. This causes such a change in the proteins, which include the caseins and the albumens, that there is actually provided different and new molecular weights for these compounds, and these molecular weights are so entirely different from anything heretofore known that a new product necessarily results. The iso-electric points of the proteins after the heat treatment are distinctly different from the isoelectric points of the proteins in natural milk; the mixture of proteins has new and different acid combining and alkali combining curves from those of normal milk; and the viscosity of solutions of these new products do not correspond with proteins as they exist in normal milk or in any other product heretofore known. As a point of maximum importance, these proteins possess tremendously augmented water absorbing powers beyond anything existent in normal milk; the ease with which foams are produced is materially augmented over heretofore known milk proteins; and the stability of these foams has been greately increased. The final product, either in the form of milk as a fluid, partially evaporated, or in a dry state, possesses new, important and distinctive properties either lacking in normal milk or materially augmented over those of normal milk.

These properties are further enhanced by the increased ionization of the proteins by the alkali treatment. This treatment is applied where the product is to be employed for uses where such properties are desirable or necessary.

The improved product in any of its several forms will displace the use of materials foreign to dairy products, such as gelatin or other stabilizer in the ice cream formula. By merely displacing an equal amount of milk-solids-not-fat, in an ice cream mix, an ice cream can be prepared which possesses all the water absorbing powers necessary and at least to an equal or greater degree than that provided by a foreign stabilizer. Furthermore, such ice cream mix would have augmented whipping powers and will produce more stable foams in the freezing operation. Moreover, such an ice cream will possess a more desirable melt-down with an improved and more natural cream flavor.

In the case of bread, using the new product, the loaf can be made larger for the same weight, will possess a brighter and richer color of the bloom, will show a softer, closer texture and finer crumb; will retain its moist condition longer, and in general will produce a better bread due directly to the augmented water absorbing powers and other properties of the product.

When the new product is used to replace milk-solids-not-fat, in whipping cream, it eliminates the necessity of artificial aging or the addition of foreign materials of a non-dairy product nature generally used to produce a better whip and a more stable foam.

The product formed as a result of this process, either in a fluid, evaporated, or dry state, can replace the use of normal milk and milk products in the manufacture of food products, particularly where it is desirable or necessary to present in such food products better flavor, increased viscosity, higher water absorbing powers, greater whips to more stable foams, more standardized hydrogen ion concentrations, increased swelling and other well known characteristics.

The improved product shows a pronounced economical method from a cost standpoint because it not only displaces other and more expensive products which normally would be added to the food product but will augment some of those desirable properties of the food product with very much less quantities of the new product than would be used in the case of other milk or milk products.

As previously stated, the product developed as a result of the described process has important uses in industries other than in connection with foods. For example, the product may be mixed with cement and whipped, producing a porous composition in the nature of a cement which floats, is as light as cork, and forms a rigid, foamy product having extremely high insulating value in construction work. In such non-food use of the product, the alkali treatment may utilize any known alkali, since there are no questions of human health involved. For the same reason the pH need not be restricted, but may readily be carried up to pH 11.5. The specific use above mentioned is intended to indicate that the product as developed according to the process herein described, while originally designed for food uses, is nevertheless of extreme important value in other industries and the specific reference to one such other use is intended to indicate the intention on the part of applicant to clearly indicate the value of the product for uses other than in food products.

This application is a continuation in part of my application filed March 3, 1939, Serial No. 259,653 which has now become abandoned.

What is claimed as new is:

1. The process of making a milk product, consisting in subjecting skim milk to a pressure in excess of atmospheric and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, then cooling the mass and adding alkalies possessing sodium ions to a hydrogen ion concentration between pH 9 and 11.5.

2. The process of making a milk product, consisting in subjecting skim milk to a pressure in excess of atmospheric and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, then cooling the mass and adding alkalies to form alkali proteins of the newly developed proteins, then changing the hydrogen ion concentration to a point approximately between pH 6.5 and 8.5 by adding at least one acid of the group consisting of hydrochloric, lactic, acetic, citric, phosphoric and tartaric acids.

3. The process of making a milk product, consisting in subjecting skim milk to a pressure in excess of atmosphere and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, whereby to effect a definite change in the molecular structure of the proteins, then cooling the mass, then changing the newly formed proteins to a hydrogen ion concentration of approximately pH 10.5 where the mixture becomes opaque with some fluorescence, and then adjusting the hydrogen ion concentration between pH 6.5 and 8.5.

4. The process of making a milk product, consisting in subjecting skim milk to a pressure in excess of atmosphere and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, then cooling the mass and adding sodium hydroxide to a hydrogen ion concentration between pH 9 and 11.5.

5. The process of making a milk product, consisting in subjecting skim milk to a pressure in excess of atmosphere and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, then cooling the mass and adding sodium hydroxide to form alkali proteins of the newly developed proteins, then changing the hydrogen ion concentration to a point approximately between pH 6.5 and 8.5 by adding at least one acid of the group consisting of hydrochloric, lactic, acetic, citric, phosphoric and tartaric acids.

6. The process of making a milk product, consisting in subjecting skim milk to a pressure in excess of atmosphere and to a temperature approximating 240 degrees Fahrenheit for a period of approximately ten minutes and then immediately subjecting the treated milk to a further heat treatment of approximately 210 degrees Fahrenheit for a period of approximately seventy-five minutes while the milk is under atmospheric pressure, whereby to effect a definite change in the molecular structure of the proteins, then cooling the mass, then changing the newly formed proteins to a hydrogen ion concentration of approximately pH 10.5 by adding sodium hydroxide where the mixture becomes opaque with some fluorescence, and then adjusting the hydrogen ion concentration between pH 6.5 and 8.5.

7. The process of making a milk product consisting in heat treating skim milk at about 240 degrees Fahrenheit for about ten minutes followed by further treatment at about 210 degrees Fahrenheit for about seventy-five minutes, then cooling and adding an alkali to adjust the hydrogen ion concentration to the range between pH 9 and 11.5, and then cooling.

8. A process of making a concentrated skim milk product consisting in subjecting skim milk to heat treatment at about 240 degrees Fahrenheit for about ten minutes followed by further heat treatment at about 210 degrees Fahrenheit for about seventy-five minutes, then cooling and then adjusting the hydrogen ion concentration by the addition of an alkali to the range between pH 9 and 11.5, and then condensing to a higher concentration and cooling.

9. The process of making a milk product consisting in heat treating skim milk at about 240 degrees Fahrenheit for about ten minutes followed by further heat treatment at about 210 degrees Fahrenheit for about seventy-five minutes, then cooling and by the addition of an alkali of the type consisting of AB, where A is a member of the class consisting of sodium, potassium and ammonium, and B is a member of the class consisting of hydroxides, carbonates and phosphates, adjusting the hydrogen ion concentration to the range between pH 9 and 11.5, and finally cooling.

10. The process of making a powdered skim milk product consisting in heat treating skim milk at about 240 degreees Fahrenheit for about ten minutes followed by further heat treatment at about 210 degrees Fahrenheit for about seventy-five minutes, then cooling, and by the addition of an alkali, adjusting the hydrogen ion concentration to the range between pH 9 and 11.5, and promptly following by the addition of an acid, adjusting the hydrogen ion concentration to the range between pH 6.5 and 8.5, and then reducing the mass to a powder.

11. The process of making a concentrated skim milk product consisting in subjecting skim milk to a heat treatment of about 240 degrees Fahrenheit for about ten minutes followed by further heat treatment at about 210 degrees Fahrenheit for about seventy-five minutes, then cooling, and by the addition of an alkali of the group consisting of sodium, potassium and ammonium in the form of hydroxides, carbonates, and alkaline phosphates, singly and in combinations, adjusting the hydrogen ion concentration to the range between pH 9 and 11.5, and promptly following by the addition of an acid to adjust the hydrogen ion concentration to the range between pH 6.5 and 8.5, then condensing to a higher concentration and finally cooling.

12. The process of making a milk product consisting in heat treating skim milk at about 240 degrees Fahrenheit for about ten minutes followed by further heat treatment at about 210 degrees Fahrenheit for about seventy-five minutes, then cooling and adding an alkali of the group consisting of sodium, potassium, and ammonium in the form of hydroxides, carbonates, and alkaline phosphates, singly and in combinations, adjusting the hydrogen ion concentration to the range between pH 9 and 11.5, and promptly following by the addition of acids of the group consisting of hydrochloric, lactic, acetic, citric, phosphoric, and tartaric, singly and in combinations, adjusting the hydrogen ion concentration to the range between pH 6.5 and 8.5, and finally cooling.

13. A product made from skim milk and having as compared with skim milk relatively increased viscosity, relatively increased whipping properties with the proteins of the product of increased water absorbing power, the product being produced by heat-treating the skim milk at about 240 F. for about ten minutes followed by further heat treatment at about 210° F. for about seventy-five minutes, then adding an alkali to adjust the hydrogen-ion concentration to the range between pH 9 and 11.5, then adjusting the hydrogen-ion content to the range between pH 6.5 and 8.5 by adding an acid, and then cooling.

14. A product made from skim milk and having as compared with skim milk relatively increased viscosity, relatively increased whipping properties with the proteins of the product of increased water absorbing power, the product being produced by heat-treating the skim milk at about 240° F. for about ten minutes followed by further heat treatment at about 210° F. for about seventy-five minutes, then adding an alkali to adjust the hydrogen-ion concentration to the range between pH 9 and 11.5, then adjusting the hydrogen-ion content to the range between pH 6.5 and 8.5 by adding an acid, then condensing to a higher concentration, and then cooling.

15. A product made from skim milk and having as compared with skim milk relatively increased viscosity, relatively increased whipping properties with the proteins of the product of increased water absorbing power, the product being produced by heat-treating the skim milk at about 240 F. for about ten minutes in a closed container under a pressure exceeding atmospheric pressure, followed by further heat treatment at about 210° F. for about seventy-five minutes while open to atmospheric pressure, then adding an alkali to adjust the hydrogen-ion concentration to the range between pH 9 and 11.5, then adjusting the hydrogen-ion content to the range between pH 6.5 and 8.5 by adding an acid, and then cooling.

LEWIS A. BAUMANN.